A. J. THORNLEY.
PNEUMATIC SAFETY APPLIANCE OF CARS.
APPLICATION FILED JULY 3, 1908.
906,833.
Patented Dec. 15, 1908.
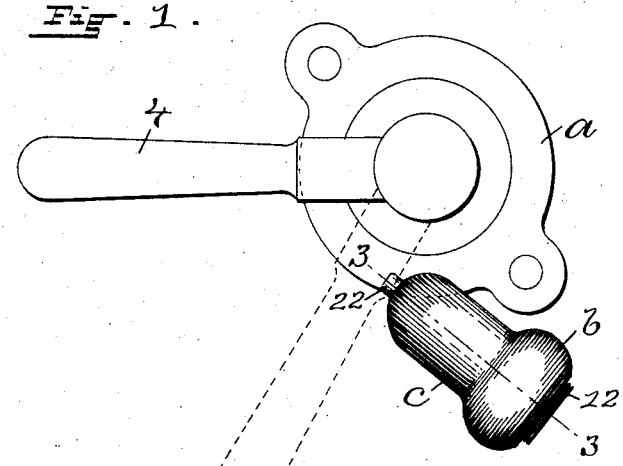
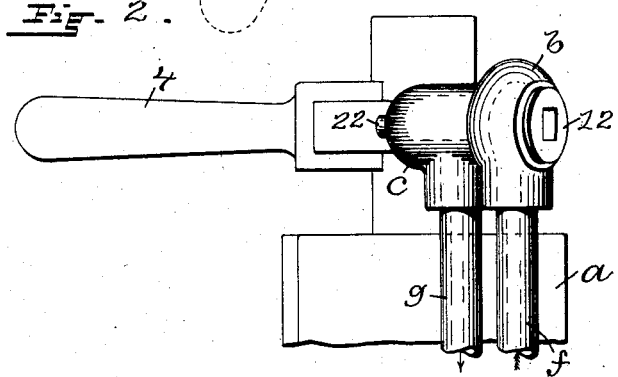
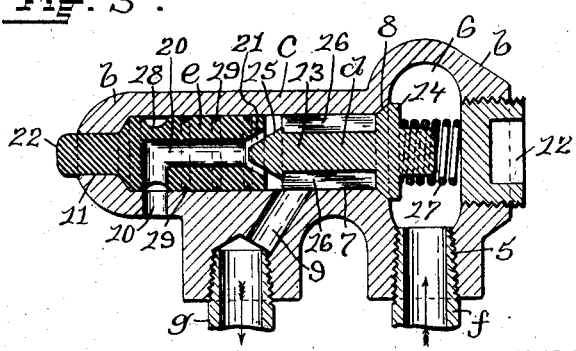
WITNESSES:
Chas. H. Luther
Ada E. Fagerty
INVENTOR:
Albert J. Thornley
by Joseph A. Miller
ATTORNEY.

UNITED STATES PATENT OFFICE.

ALBERT J. THORNLEY, OF PAWTUCKET, RHODE ISLAND, ASSIGNOR TO CONSOLIDATED CAR FENDER COMPANY, OF PROVIDENCE, RHODE ISLAND, A CORPORATION OF RHODE ISLAND.

PNEUMATIC SAFETY APPLIANCE OF CARS.

No. 906,833.  Specification of Letters Patent.  Patented Dec. 15, 1908.

Application filed July 3, 1908. Serial No. 441,880.

*To all whom it may concern:*

Be it known that I, ALBERT J. THORNLEY, a citizen of the United States, residing at Pawtucket, in the county of Providence and State of Rhode Island, have invented a new and useful Improvement in Pneumatic Safety Appliances of Cars, of which the following is a specification.

This invention has reference to an improvement in pneumatic safety appliances of cars and more particularly to an improvement in auxiliary air valves, operated in connection with the air brake system of street cars.

The object of my invention is to provide the air brake system of street cars with an independent auxiliary valve adapted to be operated by the regular air brake valve lever and operatively connected with the source of compressed air supply and with air controlled mechanisms for dropping the fender, for releasing the sand, for operating an emergency air brake, and for ringing the bell or for blowing a whistle.

A further object of my invention is to improve the construction of an auxiliary air valve, whereby the valve is opened by the usual air brake valve lever when thrown into its extreme open position and closed automatically when the air brake valve lever is moved into its normal operating position.

A still further object of my invention is to construct an air valve so that after the compressed air has done its work the valve will automatically close and the compressed air will exhaust through the valve into the atmosphere.

My invention consists in the peculiar and novel construction of an air valve adapted to be opened by the regular air brake valve lever of a car and to close automatically, said air valve having details of construction, as will be more fully set forth hereinafter and claimed.

Figure 1 is a top plan view of my improved auxiliary air valve and the regular air brake valve of a car, showing the lever of the air brake valve in the closed position in full lines and in the extreme open position in broken lines. Fig. 2 is a side view of Fig. 1, showing the lever of the air brake valve in the closed position and the pipes leading to and from the auxiliary air valve, and Fig. 3 is an enlarged longitudinal sectional view through the auxiliary valve taken on line 3 3 of Fig. 1 with the valve in the normal closed position.

In the drawings, $a$ indicates the regular air brake valve of a car, $b$ my improved auxiliary air valve consisting of a casing $c$, an internal valve member $d$ and a piston $e$, $f$ a pipe leading from a source of compressed air supply (not shown) to the auxiliary air valve $b$, and $g$ a pipe leading from the auxiliary air valve $b$ to compressed air controlled mechanisms (not shown) for dropping the fender, for releasing the sand, for operating an emergency air brake, and for ringing a bell or for blowing a whistle. The air brake valve $a$ is of the usual construction. It is connected to the regular air brake system (not shown) and has the controlling lever 4 and a spring stop (not shown) located in the path of the lever at a point adjacent the extreme opening throw of the lever. The casing $c$ of the auxiliary valve $b$ is preferably shaped, as shown in Figs 1 and 3, and is constructed to have the inlet duct 5, the chamber 6, the longitudinal bore 7, the valve seat 8 at the intersection of the chamber 6 and the bore 7, the outlet duct 9 extending from the bore 7 at the inner end of the piston $e$, the exhaust port 10 extending from the bore 7 at the outer end of the piston $e$, the longitudinal hole 11 extending outward from the end of the casing for the stem of the piston $e$, all formed integral, and the screw plug 12 closing the opening into the chamber 6 in the end of the casing. The internal valve member $d$ consists of a stem 13 having the valve head 14 adjacent the end of the stem in the chamber 6 and shaped to fit on the valve seat 8, the cone-shaped end 15 in the bore 7 and the three or more longitudinal wings 16 16 adapted to hold the stem 13 centrally in the bore 7. A coiled spring 17 is placed on the end of the stem 13 in the chamber 6 intermediate the valve head 14 and the plug 12, as shown in Fig. 3. The piston $e$ is constructed to have a sliding fit in the bore 7, an annular groove 18 on a line with the exhaust port 10, the packing rings 19 19, a central hole 20 connected with the groove 18 and having a cone-shaped opening 21 shaped to receive the cone-shaped end 15 of the internal valve member $d$, and a stem 22 which extends outward through the hole 11 in the end of the casing, as shown in Figs. 1 and 3. The pipe $f$ is connected to the inlet port 5 in the usual way and to a source of air supply under pressure (not shown). The pipe $g$ is connected to the outlet port 9 and to any one or all of the air controlled mechanisms of a car (not shown) for dropping the fender, for releasing the sand, operating an emergency brake, and for ringing the bell or for blowing a whistle. The auxiliary valve $b$ is supported in a position to bring the end of the piston stem 22 in the path of the regular air brake valve lever 4 by the pipes $f$ and $g$, as shown in Figs. 1 and 2, or by other means.

In the operation of the auxiliary valve $b$ the regular air brake valve lever 4 is moved under normal conditions for braking and releasing the brakes, between the position as shown in full lines in Fig. 1 and the spring stop (not shown). In an emergency, such as a person or other obstruction on the track, the operator throws the controlling lever 4 to the right to the extreme limit of its throw, as shown in broken lines in Fig. 1, forcing the lever over the spring stop. This opens the usual air brake valve $a$ wide open, thereby applying the regular brakes with the full force of the compressed air and simultaneously the lever 4 engages with the piston stem 22 of the auxiliary valve $b$ and opens the same, by forcing the piston $e$ against the internal valve member $d$ and moving the valve member $d$ toward the plug 12 against the air pressure in the chamber 6 and the tension of the coiled spring 17. The valve head 14 is now moved away from the valve seat 8 and the cone-shaped end 15 of the valve member has engaged with the opening 21 and closed the hole 20 in the piston $e$. The compressed air now passes from the chamber 6 through the bore 7 between the wings 16 16 and out through the outlet duct 9 into the pipe $g$ when simultaneously with the applying of the usual air brakes, air controlled mechanisms are operated from the pipe $g$ to drop the fender, to release the sand, to apply the emergency brake, and to ring the bell or blow a whistle. When the obstruction is removed from the track the lever 4 is moved back into its regular operating position, thereby releasing the piston stem 22. The valve member $d$ closes automatically through the tension of the coiled spring 17 and the compressed air in the pipe $g$ (after doing its work) acts through the port 9 and the bore 7 on the inner end of the piston $e$ and forces the same back into its normal position, as shown in Fig. 3. The air now passes from the bore 7 through the hole 20 in the piston and out through the exhaust port 10 in the casing.

By the peculiar and novel construction and position of the auxiliary valve $b$ the natural movement of the operator in an emergency would be to give an extreme open throw to the regular air brake valve controlling lever, which will not only apply the full power to the regular brakes, but will operate simultaneously all of the beforementioned safety appliances of the car, thereby bringing all of the safety appliances of the car under the control of one lever, which is placed in the most convenient position for the operator.

Having thus described my invention, I claim as new and desire to secure by Letters Patent;—

1. A valve comprising a casing having a chamber, an inlet duct opening into the chamber, a bore extending longitudinally from the chamber, a valve seat at the intersection of the chamber and bore, an outlet duct from the bore, an exhaust port from the bore, a valve member in the bore having a valve head fitting the valve seat and a cone-shaped end, a coiled spring adapted to hold the valve member in the closed position, a piston in the bore having a stem extending outward through a hole in the casing, a cone-shaped valve seat and a hole extending from the valve seat to the exhaust port in the casing, means for securing a pipe to the inlet duct in the casing, and means for securing a pipe to the outlet duct in the casing.

2. In a valve, the combination of the following instrumentalities; a casing $c$ having an inlet duct 5, a chamber 6, a bore 7, a valve seat 8, an outlet duct 9, an exhaust port 10 and a hole 11, a valve member $d$ having a valve head 14 and a cone-shaped end 15, a piston $e$ having a hole 20 with a cone-shaped opening 21, and a stem 22, a coiled spring 17, means for securing a pipe to the inlet duct 5, and means for securing a pipe to the outlet duct 9, as described.

3. A valve composed of a casing having a main bore with an inlet and an outlet duct leading into said bore, and an exhaust port leading into said bore, a valve member for controlling the communication between said inlet and outlet ducts, and a piston sliding in said bore and provided with a hole which connects said bore and exhaust port, said valve member being adapted in one position of said piston to close one end of the hole therein.

4. A valve composed of a casing having a main bore with an inlet and an outlet duct leading thereinto, and having an exhaust port leading into said bore, means movable in said bore to control the closing and opening of said exhaust port, and means independent of said first named means and normally out of contact therewith for controlling communication between said ducts, the last named means coöperating with said first named means to prevent exhaust of the air through said exhaust port in one position of the first named means.

5. In combination with the regular air brake valve lever of an air brake system, an auxiliary valve composed of a casing having an inlet, an outlet, and an exhaust, means normally closed for controlling communication between said inlet and outlet, and means disposed in the path of travel of said air brake valve lever so as to be actuated thereby to unseat said first means and thereby open communication between said inlet and outlet, said second means being normally spaced from said first means and when in normal position establishing communication between said exhaust and the casing interior.

6. A valve composed of a casing having a main bore with an inlet, an outlet, and an exhaust port each leading into said bore, means having a hole designed to register with said exhaust port in one position, and means for controlling communication between said inlet and outlet at one end and at its opposite end closing said hole of the first named means in one position of the latter.

7. A valve composed of a casing having an inlet, an outlet, and an exhaust, a piston in the casing having a hole to register with said exhaust in one position of the piston, and a double valve member having one valve designed to control communication between said inlet and outlet, and having its other valve designed to close said hole in the piston in one position of the latter.

8. A valve composed of a casing having an inlet, an outlet, and an exhaust, a valve member having a valve to control communication between said inlet and outlet and having a second valve at its free end and a part in said casing having a hole which normally establishes communication between said inlet and outlet and which is closed by said second valve when said part is moved inwardly to unseat the first valve.

9. A valve composed of a casing having an inlet and an outlet and an exhaust, and a pair of coöperating means in said casing normally spaced from each other, one of said means normally establishing communication between said exhaust and the casing interior, and the other of the means controlling communication between said inlet and outlet, said first means when moved inwardly contacting with the second means and closing the communication between the exhaust and casing interior, and at the same time opening said communication between said inlet and outlet.

10. In combination with the regular air brake valve lever of an air brake system, an auxiliary valve composed of a casing having an inlet, an outlet, and an exhaust, a valve member having means to control communication between said inlet and outlet, and an orificed piston normally free of contact with said valve member having one end projecting outwardly from said casing and disposed in the path of said regular air brake valve lever so as to be operated by the lever when same is actuated, said piston normally having one end of its orifice in communication with said exhaust, and upon actuation by said lever having its communication with said exhaust cut-off and having the other end of its orifice closed by contact with said valve member.

11. A valve composed of a casing having an inlet, an outlet, and an exhaust, means in the casing to control communication between said inlet and outlet, orificed means in the casing having one end of the orifice thereof normally open and designed to be closed by said first means when said orificed means is moved into contact therewith, the other end of said orifice normally registering with said exhaust and being designed to cut-off communication with said exhaust by moving said orificed means out of register therewith, and means on the orificed means whereby said orificed means is actuated by the operation of the regular air brake valve lever of an air brake system.

12. In combination with the regular air brake valve lever of an air brake system, an auxiliary valve composed of a casing having an inlet, an outlet, and an exhaust, orificed means in the casing for actuation by said air brake valve lever having the outlet of the orificed means normally in register with said exhaust, and means normally closing communication between the casing inlet and outlet, adapted upon actuation of said first means to close the inlet of said orificed means and to simultaneously open communication between said inlet and outlet of the casing.

In testimony whereof I have signed my name to this specification in the presence of two subscribing witnesses.

ALBERT J. THORNLEY.

Witnesses:
   ADA E. HAGERTY.
   J. A. MILLER.